United States Patent
Choi (10) Patent No.: US 6,295,452 B1
(45) Date of Patent: Sep. 25, 2001

(54) MOBILE COMMUNICATION SYSTEM THAT SUPPORTS SOFT HANDOFF BETWEEN SWITCHING STATIONS AND METHOD FOR IMPLEMENTING HANDOFF

(75) Inventor: Eog Woo Choi, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/426,636

(22) Filed: Oct. 25, 1999

(30) Foreign Application Priority Data

Nov. 11, 1998 (KR) .................................................. 98-48270

(51) Int. Cl.[7] .............................. H04Q 7/38; H04B 7/216
(52) U.S. Cl. .......................... 455/436; 455/439; 455/442; 455/560; 379/219; 370/331
(58) Field of Search ...................................... 455/436, 439, 455/442, 560, 561, 507, 524, 466; 379/219, 220, 271, 207; 370/331

(56) References Cited

U.S. PATENT DOCUMENTS

| | | | |
|---|---|---|---|
| 5,357,505 | * 10/1994 | Tsumura et al. | 370/60 |
| 5,509,051 | * 4/1996 | Barnett et al. | 379/207 |
| 5,610,972 | * 3/1997 | Emery et al. | 379/207 |
| 5,682,416 | * 10/1997 | Schmidt et al. | 455/436 |
| 5,771,275 | * 6/1998 | Brunner et al. | 455/436 |
| 5,826,188 | * 10/1998 | Tayloe et al. | 455/436 |
| 5,930,714 | * 7/1999 | Abu-Amara et al. | 455/442 |
| 6,002,933 | * 12/1999 | Bender et al. | 455/442 |
| 6,064,887 | * 5/2000 | Kallioniemi et al. | 455/445 |

* cited by examiner

Primary Examiner—Lee Nguyen
Assistant Examiner—Simon Nguyen
(74) Attorney, Agent, or Firm—Fleshner & Kim, LLP (57) ABSTRACT

A mobile communication system is disclosed that supports soft handoff between switching stations and increase service quality. The mobile communication system can include at least one mobile switching stations having a first inter network that controls a plurality of base station controllers and at least one local switching stations coupled to the mobile switching stations. Each of the local switching stations can include a second inter network that provides a communication path between the mobile switching stations. A method for implementing handoff between switching stations can include determining at any mobile station whether an implementation condition of handoff is satisfied, determining a type of handoff at the serving base station controller using pilot information of peripheral base stations when an implementation condition for handoff is satisfied, and implementing soft handoff using an interface between a first inter network and a second inter network provided to the mobile switching station if the handoff occurs between the mobile switching stations.

27 Claims, 6 Drawing Sheets

| respective element address in switching stations | center switching station number | local switching station number | mobile switching station number |
|---|---|---|---|
| 510 | 520 | 530 | 540 |

MOBILE COMMUNICATION SYSTEM THAT SUPPORTS SOFT HANDOFF BETWEEN SWITCHING STATIONS AND METHOD FOR IMPLEMENTING HANDOFF

BACKGROUND OF THE INVENTION

1. Field of the Invention

The present invention relates to a mobile communication system and method for implementing soft handoff, and more particularly, to a mobile communication system and method that supports soft handoff between mobile switching stations.

2. Background of the Related Art

Generally, handoff is implemented in such a manner that a mobile station currently in service detects the strength of pilot signals from a serving base station and detected neighboring or remaining base stations. The serving base station is a base station providing service (e.g., a call) to the mobile station. The mobile station compares the strength of the pilot signals from the detected base stations with the strength of the pilot signal of the current serving base station to ensure readiness for obtaining a new traffic channel. If the strength of the pilot signal of the current serving base station becomes lower than a certain value, a target base station capable of maintaining a traffic channel currently in service is selected, and a call is switched into the selected target base station. Accordingly, the mobile station can continue to perform communication using the new traffic channel.

In a cellular/personal communication service (PCS) system, there are hard handoffs and soft handoffs. In the hard handoff, communication is temporarily disconnected during the call conversion. The hard handoff occurs between base stations to which different frequencies are assigned or between different mobile switching stations. In the soft handoff, communication is not disconnected. The soft handoff for a particular mobile station occurs between base stations to which the same frequencies are assigned.

Figure 1:
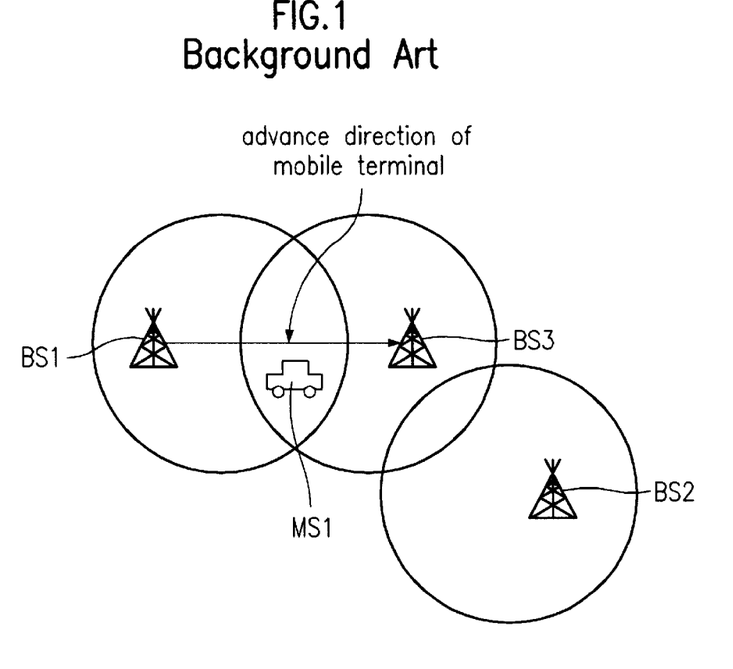
FIG. 1 is a diagram that shows soft handoff between two base stations in a mobile communication system.

FIG. 1 shows soft handoff between two base stations in a mobile communication system. As shown in FIG. 1, a first mobile station MS1 currently in service is moving from a first base station BS1 to a third base station BS3. A second base station BS2 is a neighboring base station. In the soft handoff, traffic channels between the base station BS1 and the mobile station MS1 and between the base station BS3 and the mobile station MS are respectively set at a boundary between the base station BS1 and the base station BS3.

If a signal provided through a traffic channel between the base station BS1 and the mobile station MS1 becomes equal to or below a prescribed threshold value as the mobile station MS1 moves from the first base station BS1 toward the base station BS3, the traffic channel between the base station BS1 and the mobile station MS1 is disconnected while the traffic channel between the base station BS3 and the mobile station MS1 is connected to implement the soft handoff. In such a soft handoff, the base station BS1 and the base station BS3 are controlled by the same base station controller (not shown). The base station BS1 and the base station BS3 are physically connected to each other through the base station controller.

Figure 2:
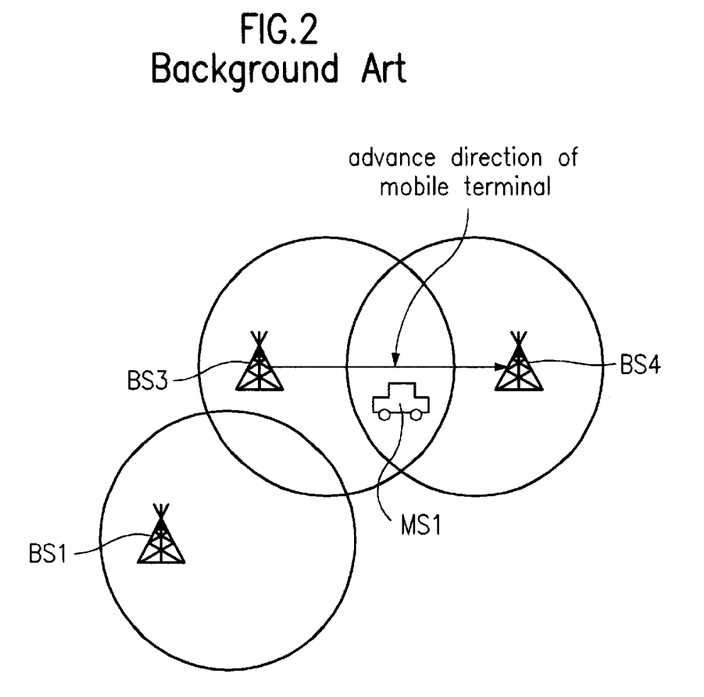
FIG. 2 is a diagram that shows hard handoff between two base stations in a mobile communication system.

FIG. 2 shows hard handoff between two base stations in a mobile communication system. With respect to FIG. 2, the hard handoff between the base stations to which different frequencies are assigned will be described.

As shown in FIG. 2, a first mobile station MS1 currently in service is moving from a third base station BS3 to a fourth base station BS4. In the hard handoff, at the boundary the mobile station MS1 drops a traffic channel with the base station BS3 and implements handoff using a new traffic channel from the base station BS4. The base station BS4 cannot detect the pilot signal of the base station BS3.

Figure 3:
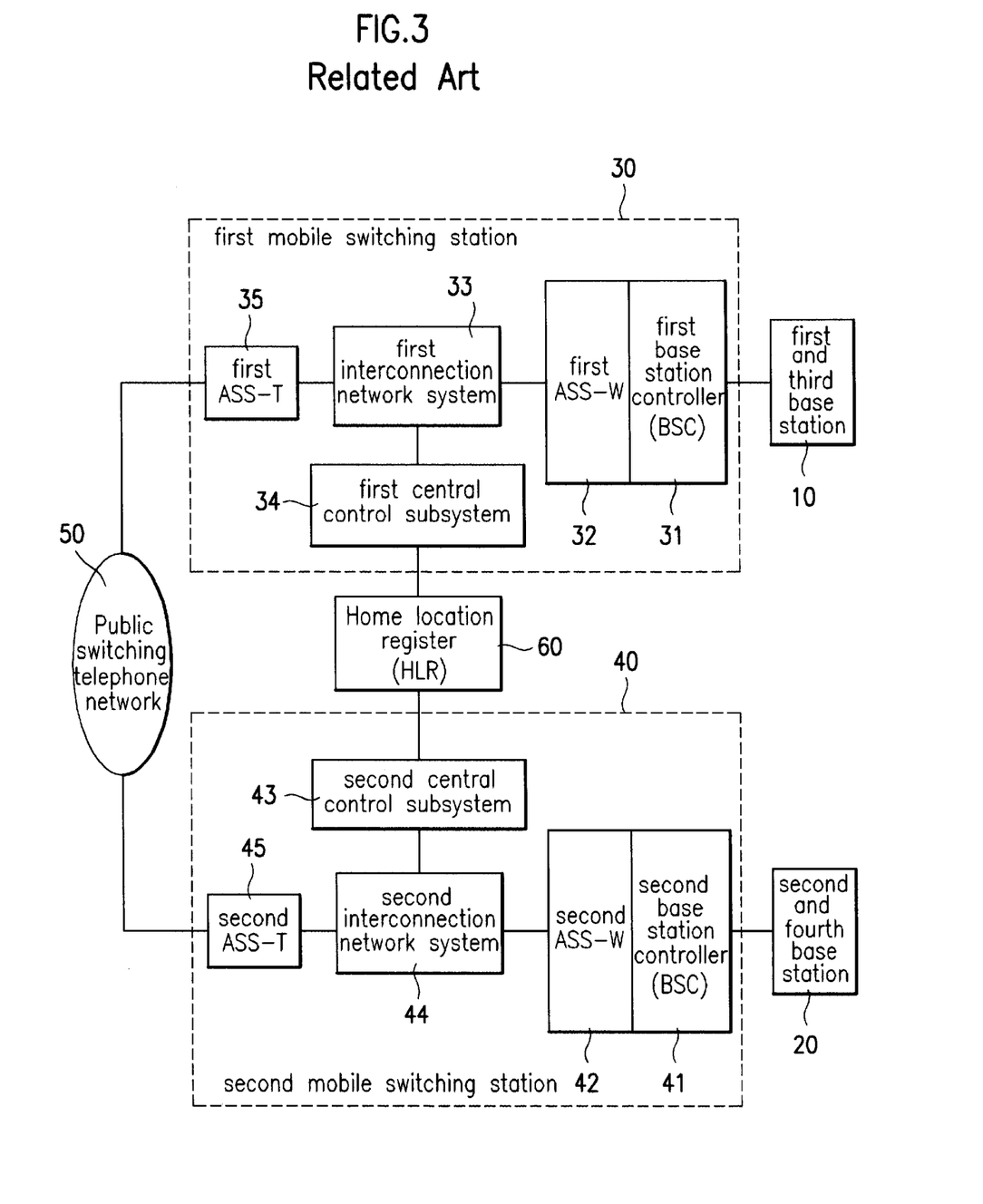
FIG. 3 is a block diagram that shows two related art mobile switching stations.

The related art hard handoff procedure between mobile switching stations will now be described with reference to FIG. 3. FIG. 3 is a block diagram of respective mobile switching stations.

Referring to FIG. 3, first and second access switching subsystems for wireless subscribers (ASS-W) 32 and 42 perform a call processing function and handoff and mobility management functions for the mobile station MS1. First and second access switching subsystems for wireless subscribers (ASS-T) 35 and 45 match first and second mobile switching stations 30 and 40 with a public switching telephone network 50 to perform call processing for a trunk, as shown in FIG. 3.

The first and second interconnection network subsystems 33 and 43 perform call processing functions such as mobile station number translation, route control function and switching functions. First and second central control subsystems 34 and 44 perform management, maintenance, charging and statistic functions of the system, process location registration of mobile subscribers and store/manage subscribers' information. The first mobile switching station 30 and the second mobile switching station communicate with a home location register 60 to determine and register the location of the mobile station MS1.

In FIG. 3, it is assumed that a mobile station is moving from a service area of a first and third base station 10 of the first mobile switching station 30 to a service area of a second and fourth base station 20, as shown in FIGS. 1 and 2, respectively, of the second mobile switching station 40. Initially, the first base station BS1 is the serving base station 10 of the mobile station MS1 for FIG. 1, or the third base station BS3 is the serving base station 10 of the mobile station MS1 for FIG. 2.

With reference to FIGS. 2 and 3, the mobile station currently in service periodically measures the strength of the pilot signal provided from the third base station 10 where a speech path is currently set and the strength of the pilot signal provided from a candidate base stations. The mobile station further compares the respective pilot signals provided from the candidate base stations with a preset threshold value. As a candidate base station, if the strength of the pilot signal provided from the fourth base station 20 is greater than the threshold value, the mobile station transmits the measurement results to its base station (i.e., base station 10) together with a pilot strength measurement message (PSSM).

The mobile station currently in service periodically measures the strength of a pilot signal of an active set, which includes active base stations where a speech path is set, and the strength of a pilot signal of a candidate set that includes candidate base stations received in the mobile station that can completely be modulated as a forward traffic channel. The mobile station further periodically measures the strength of a pilot signal that is not included in the current active set or candidate set or the strength of a pilot signal of a neighboring set, which includes neighboring base stations that can become a handoff candidate set. Then, the mobile station transmits the measurement results to its base station together with the PSMM.

The third base station 10 detects the fourth base station 20 toward which the mobile station is moving in response to the strength of the pilot signal included in the PSMM. If a corresponding mobile station departs from the third base station 10 service area, the third base station 10 transmits the PSMM to the first base station controller 31. However, if it is determined that the base station corresponding to the received PSSM is not under the control of the first base station controller 31, the first base station controller 31 detects the fourth base station 20 and transmits a handoff request signal to the second mobile switching station 40. The handoff request signal is transmitted to the second base station controller 41 and the fourth base station 20 through a first ASS-W 32, a first interconnection network subsystem 33, a first ASS-T 35, a public switching telephone network 50, a second ASS-T 45, a second interconnection network subsystem 44, and a second ASS-W 42.

The mobile station releases a speech path set between the mobile station and the third base station 10 under the control of the first base station controller 31. The fourth base station 20 sets a new traffic channel with the mobile station in response to the handoff request signal of the second base station controller 41. In the hard handoff between mobile switching stations, communication drops temporarily occur.

As described above, the related art handoff of mobile stations have various disadvantages. In the related art hard handoff method between the mobile switching stations, a communication protocol for implementing soft handoff between base station controllers of the respective mobile switching stations is not supported. Therefore, a hard handoff request signal is transmitted from the serving base station controller to the target base station controller through a public switching telephone network. As a result, the target base station controller that receives the handoff request signal assigns a traffic channel to the mobile station through one base station. Since the mobile station drops the traffic channel with the serving base station and maintains communication through a new traffic channel assigned from the target base station controller, there is a problem that communication drop occurs temporarily. This provides poor quality of service during communication through the mobile stations. In a particular bad result, hard handoff fails during communication, thereby unexpectedly disconnecting communication.

The above references are incorporated by reference herein where appropriate for appropriate teachings of additional or alternative details, features and/or technical background.

SUMMARY OF THE INVENTION

An object of the present invention is to substantially obviate at least one of the problems and/or disadvantages of the related art and to provide at least one of the advantages set forth below.

Another object of the present invention is to provide a communication system and method that supports soft handoff between mobile switching stations.

Another object of the present invention is to increase quality of service in a communication system. A further object of the invention is to decrease the drops of hard handoff. Another object of the invention is to increase a percentage of soft handoffs.

To achieve at least the above objects and other advantages in a whole or in parts and in accordance with the purpose of the present invention, as embodied and broadly described, a mobile communication system that supports soft handoff between switching stations includes at least one or more mobile switching stations for providing a physical link switching service between base station controllers, having a first inter network for controlling the base station controllers, and at least one or more local switching stations having a second inter network for providing a communication path between the mobile switching stations. Accordingly, handoff between the mobile switching stations is performed by an interface between the first inter network and the second inter network.

To further achieve the above objects in a whole or in parts, a mobile communication system that supports soft handoff between switching stations includes at least one or more mobile switching stations having a first inter network for controlling a plurality of base station controllers, and at least one local switching stations connected to the mobile switching stations, having a second inter network for providing a communication path between the mobile switching stations.

To further achieve the above objects in a whole or in parts, a method for implementing handoff includes the steps of determining at any mobile station whether to perform handoff under the circumstances that communications are established by relay operation of a serving base station and control operation of a serving base station controller, determining a type of handoff at the serving base station controller using pilot information of peripheral base stations when a handoff condition is satisfied, and implementing soft handoff using interface between a first inter network and a second inter network provided with the mobile switching station if the handoff occurs between the mobile switching stations.

To further achieve the above objects in a whole or in parts, a mobile communication system includes a plurality of a first group of base stations, a plurality of a second group of base stations, a first base station controller controlling the first group of base stations, a second base station controller controlling the second group of base stations, a first mobile switching station controlling the first base station controller, a second mobile switching station controlling the second base station controller, and a single local switching station coupled to the first and second mobile switching stations, wherein when a user equipment satisfies conditions of handover between a base station of the first group and a base station of the second group, the local switching station allows soft handover between the first mobile switching station and the second mobile switching station.

To further achieve the above objects in a whole or in parts, a method for implementing handoff includes providing a plurality of base station controllers, wherein each of the base station controllers controls a corresponding set of base stations of the plurality of base stations, grouping a plurality of mobile switching stations to provide a physical link switching service between the base station controllers, wherein each of the mobile switching stations includes the first inter network that controls base station controllers connected to said each of the mobile switching stations, and providing a local switching stations with a second inter network that provides a communication path between the mobile switching stations, wherein a handoff between the mobile switching stations is performed by an interface between the first inter network and the second inter network.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 4:
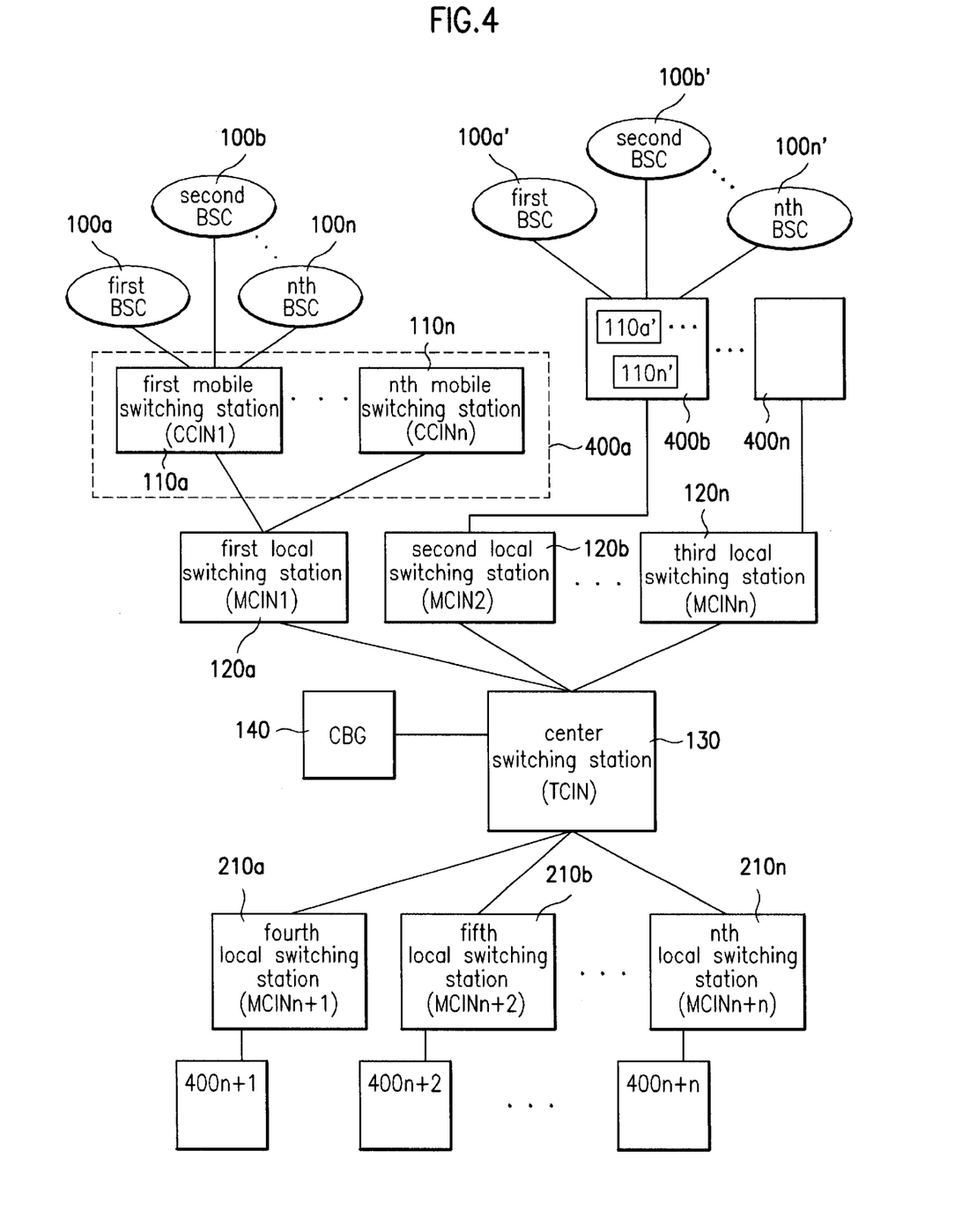
FIG. 4 is a block diagram that shows a preferred embodiment of a communication system that supports soft handoff between mobile switching stations according to the present invention.

FIG. 4 is a schematic view of a first preferred embodiment of a communication system that supports soft handoff between mobile switching stations in a mobile communication system according to the present invention. As shown in FIG. 4, the first preferred embodiment of the communication system that supports soft handoff between mobile switching stations (e.g., 110a~110n) and/or local switching stations includes a plurality of base station controllers BSC 100a~100n, at least one or more mobile switching stations 110a~110n in a switching office 400 for providing a physical link switching service between the base station controllers 100a~100n and at least one local switching station 120a~120n, 210a~210n. Each of the mobile switching stations 110a~100n has a first inter network CCIN for controlling the base station controllers 100a~100n. Each of the local switching stations 120a~120n, 210a~210n has a second inter network MCIN for providing a communication path between the mobile switching stations 110a~110n, so that an interface occurs for communications between the first inter network CCIN and the second inter network MCIN during handoff between the mobile switching stations 110a~110n. The local switching stations 120a~120n and 210a~210n further include a central switching station 130 having a third inter network TCIN, which provides a communication path between the local switching stations 120a~120n and 210a~210n.

As shown in FIG. 4, the first preferred embodiment of the communication system that supports soft handoff between mobile switching stations (e.g., 110a and 110a') and/or local switching stations (e.g., 120a~210n) can further include switching offices 400b~400$_{n+n}$ for providing a physical link switching service between at least a first group of the base station controllers 100a~100n and a second group of a plurality of base station controllers BSC 100a'~100n' through the local switching stations 120a~120n, 210a~210n. Each of the mobile switching stations 110a'~110n' has a first inter network CCIN for controlling the base station controllers 100a'~100n'. The local switching stations 120a~120n, 210a~210n can also use the second inter network MCIN for providing a communication path between the mobile switching stations 110a~110n and 110a'~110n', so that an interface occurs for communications between the first inter network CCIN and the second inter network MCIN during handoff between the first group of base station controllers BSC 110a~110n and the second group of base station controllers BSC 110a'~110n'.

The mobile switching stations 110a~110n serve as nodes for user traffic between a mobile communication network and a general telephone network (public telephone network). The mobile switching stations 110a~110n further serve as nodes between different mobile switching stations in the same mobile communication networks or different mobile communication networks. Also, the mobile switching stations 110a~110n provide the mobile station with line switching services, and search for the location of the mobile station to support both additional functions for enabling mobile telephone services and handoff functions for maintaining communication services even if the location of the mobile station is changed.

Further, the respective mobile switching stations 110a~110n are provided with a center code division multi-access inter network (Center CDMA Inter Network: CCIN), respectively. The CCIN preferably provides a communication path for implementing soft handoff between the base station controllers 100a~100n and is used as a communication channel between the mobile switching stations 110a~100n and the base station controllers 100a~100n. Each CCIN has an interface with a master code division multi-access inter network (Master CDMA Inter Network: MCIN), which is a second inter network for communication between the mobile switching stations 110a~110n.

The local switching stations 120a~120n and 210a~210n are preferably one by one provided in a switching office 400 having at least two or more mobile stations 110a~110n to provide a communication path for implementing soft handoff between the mobile switching stations 110a~110n in the switching office 400. The reason why one local switching station is coupled to one switching office 400 is that it is easy to maintain the mobile switching stations 110a~110n in the switching office 400. In the first preferred embodiment of the present invention, one switching office 400 includes two or more mobile switching stations 110a~110n. Although, the present invention is not intended to be so limited.

Further, the respective local switching stations 120a~120n and 210a~210n are provided with the MCIN for controlling the CCIN of the mobile switching stations 110a~110n. The MCIN provides a communication path for implementing soft handoff between the mobile switching stations 110a~110n. The MCIN is used as a communication channel between the mobile switching stations 110a~110n coupled to the respective local switching stations 120a~120n and 210a~210n. The MCIN performs an interface function with a top code division multi-access inter network (Top CDMA Inter Network: TCIN), and is a second inter network for communication between the local switching stations 120a~120n and 210a~210n.

The central switching station 130 is high level network equipment for managing a plurality of local switching stations 120a~120n and 210a~210n. The central switching station 130 is provided to solve any problems that may occur when implementing soft handoff between the mobile switching stations 110a~110n by the local switching stations 120a~120n and 210a~210n. In other words, to implement handoff when any one of the local switching stations manages the other local switching stations, the number of subscribers or mobile stations continues to increase. Thus, the number of the local switching stations as well as the number of the mobile switching stations increase. In this case, a problem may occur because there is limitation in capacity of the high level local switching station capable of receiving the low level local switching stations. To solve such problems, there is preferably provided a center switching station 130 as a high level network equipment. Some of the local switching stations 120a~120n and 210a~210n may be provided in the center switching station 130.

The center switching station 130 is provided with the TCIN coupled to the center switching station 130 for controlling the MCIN of the local switching stations 120a~120n and 210a~210n. The TCIN provides a communication path for implementing soft handoff between the local switching stations 120a~120n and 210a~210n, and is used as a communication channel between the local switching stations 120a~120n and 210a~210n coupled to the center switching station 130. The center switching station 130 is also coupled to a cell broadcasting gateway (CBG) 140, which is a cell broadcasting center for a broadcasting short message service.

Figure 5:
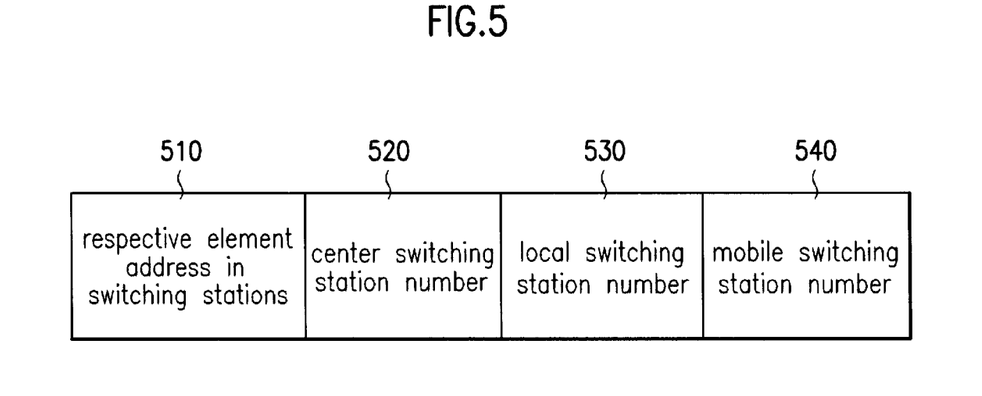
FIG. 5 is a schematic view of an exemplary data frame transmitted between mobile switching stations according to the present invention.

FIG. 5 is a diagram that shows a schematic view of an exemplary data frame transmitted between a mobile switching station according to the present invention. In the first preferred embodiment of the present invention, a data frame transmitted between mobile switching stations 110a~110n includes a first field 510 indicating an address of each element provided in the mobile switching station, a second field 520 indicative of the center switching station number, a third field 530 indicative of the local switching station number, and a fourth field 540 indicative of the mobile switching station number. Each element in the mobile switching station includes, for example, address of a base station processor and an address of a base station control processor. The respective element address in the respective mobile switching station is uniquely assigned. In other words, all elements in the mobile communication network have unique addresses so that a communication path can be provided referring to each element number when implementing handoff through the mobile communication network or system.

Figure 6:
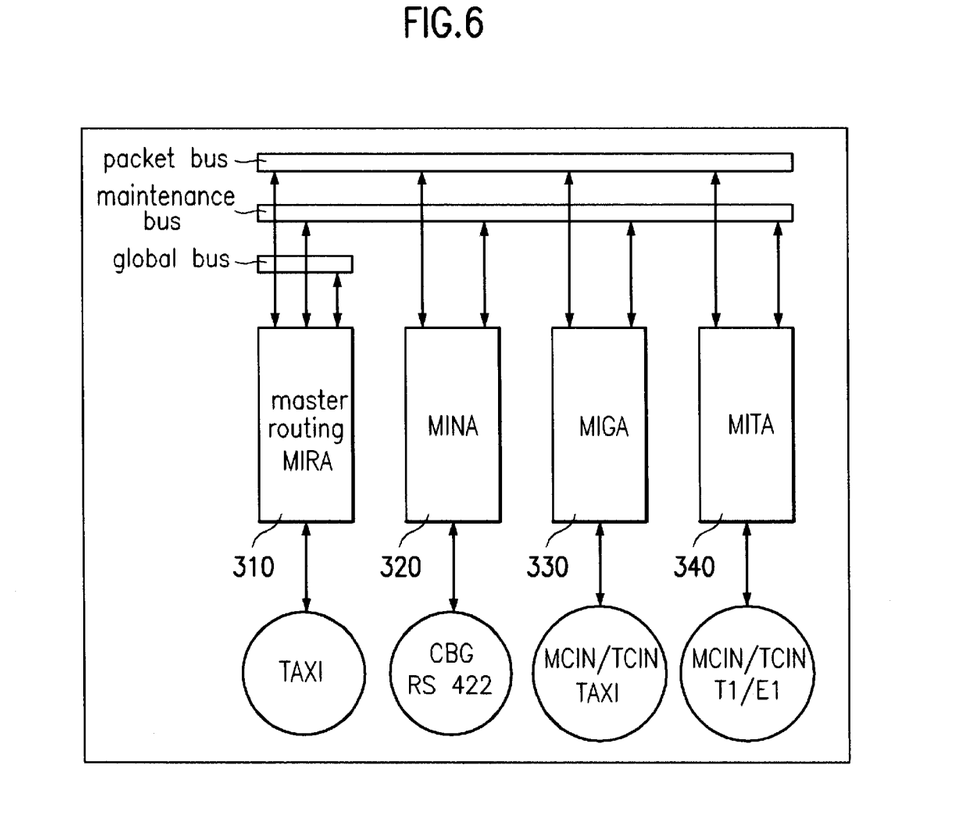
FIG. 6 is a schematic view of a master code division multi-access inter network (MCIN) or a top code division multi-access inter network (TCIN) respectively provided for a central switching station or a local switching station according to the present invention.

FIG. 6 is a diagram that shows a schematic view of an exemplary master code division multi-access inter network (MCIN) of the first to the nth local switching stations 120a~120n and 210a~210n or an exemplary top code division multi-access inter network (TCIN) of the central switching station 130 respectively provided for a center switching station or a local switching station according to the present invention. The MCIN and the TCIN preferably provide a communication path for a voice packet and a control packet. The voice packet and the control packet are preferably transmitted between the CCIN of the mobile switching stations 110a~110n to provide a physical access path required for call processing of the mobile station.

Since the MCIN processes voice data of the CCIN by packet, the MCIN requires high reliability and high speed routing for uniformly maintaining processing time of each voice packet. Likewise, the TCIN requires high speed routing and various matching functions with the MCIN.

Further, since the MCIN should provide various matching, such as long distance matching of several hundreds of kilometers (kms), short distance matching of several tens of meters (m), and high speed/low speed matching, between the CCINs, the MCIN has a high speed packet routing function and various interface functions. Likewise, the TCIN requires a high speed routing function and various matching functions between the MCIN and the TCIN. In other words, the CCIN in the mobile switching stations sets a communication path through the MCIN, and the MCIN between the mobile switching stations sets a communication path for implementing soft handoff through the TCIN. Thus, the TCIN requires the high speed routing function and the various matching functions between the MCIN and the TCIN.

To provide such high speed packet routing functions and various interface functions, the MCIN and the TCIN according to the first preferred embodiment have a parallel packet bus for packet transmission and a serial maintenance bus for maintenance. The MCIN and TCIN further preferably include an RS-422 interface for detection of hardware disorder and corresponding alarms and for transmission of short message, an ITU-T G.703_T1/E1(Non-Frame/Non-Channelized) for interface between switching offices, and a TAXI link for interface inside switching offices.

As shown in FIG. 6, the MCIN or the TCIN includes a master inter-working routing board assembly (MIRA) 310 for performing network management and extension functions as a network master and detecting and reporting disorder and alarm through the packet bus and the maintenance bus. A first packet transmission portion, i.e., a Master Inter-working Gateway board Assembly (MIGA) 330, is linked with the TCIN inside the switching office through the TAXI (100 Mbps) link for transmitting packet data. A second packet transmission portion, i.e., a Master Inter-working Trunk board Assembly (MITA), is linked with the TCIN or the MCIN between the switching offices through T1/E1 interface, for transmitting packet data. The TCIN further includes a master node (Master Inter-working Node board Assembly: MINA) 320 for providing the RS-422 interface for linking with the CBG 140. The MCIN can include the master node 320 when the CBG 140 is linked with the local switching stations 120a~120n and 210a~210n. In the above-described first preferred embodiment of a communication system having a network for handoff between the CCINs, since high level network controls low level network, it is possible to facilitate handoff and maintenance.

Figure 7A:
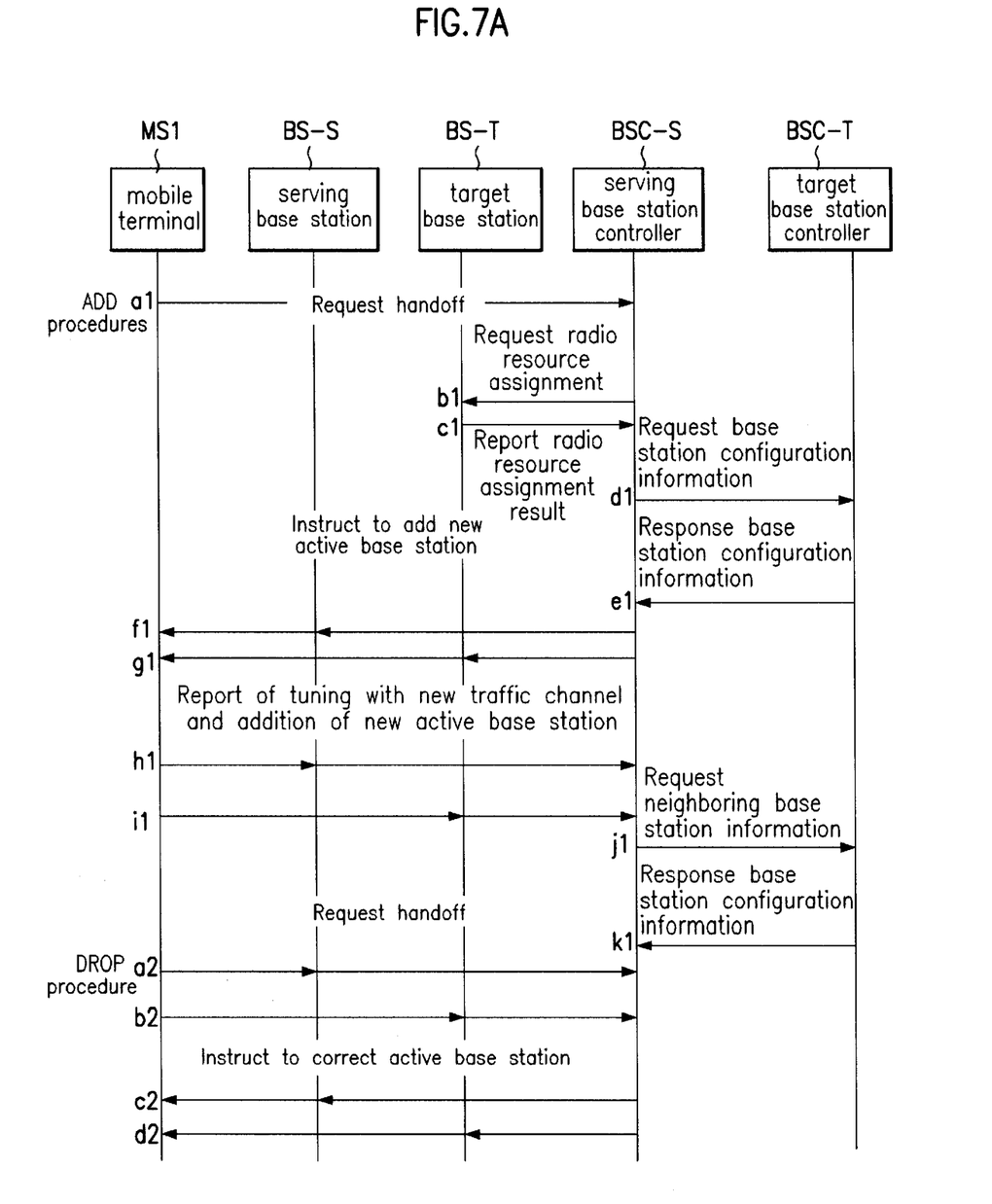
FIGS. 7A–7B are flow charts that show a preferred embodiment of a method for handoff between mobile switching stations according to the present invention.
Figure 7B:
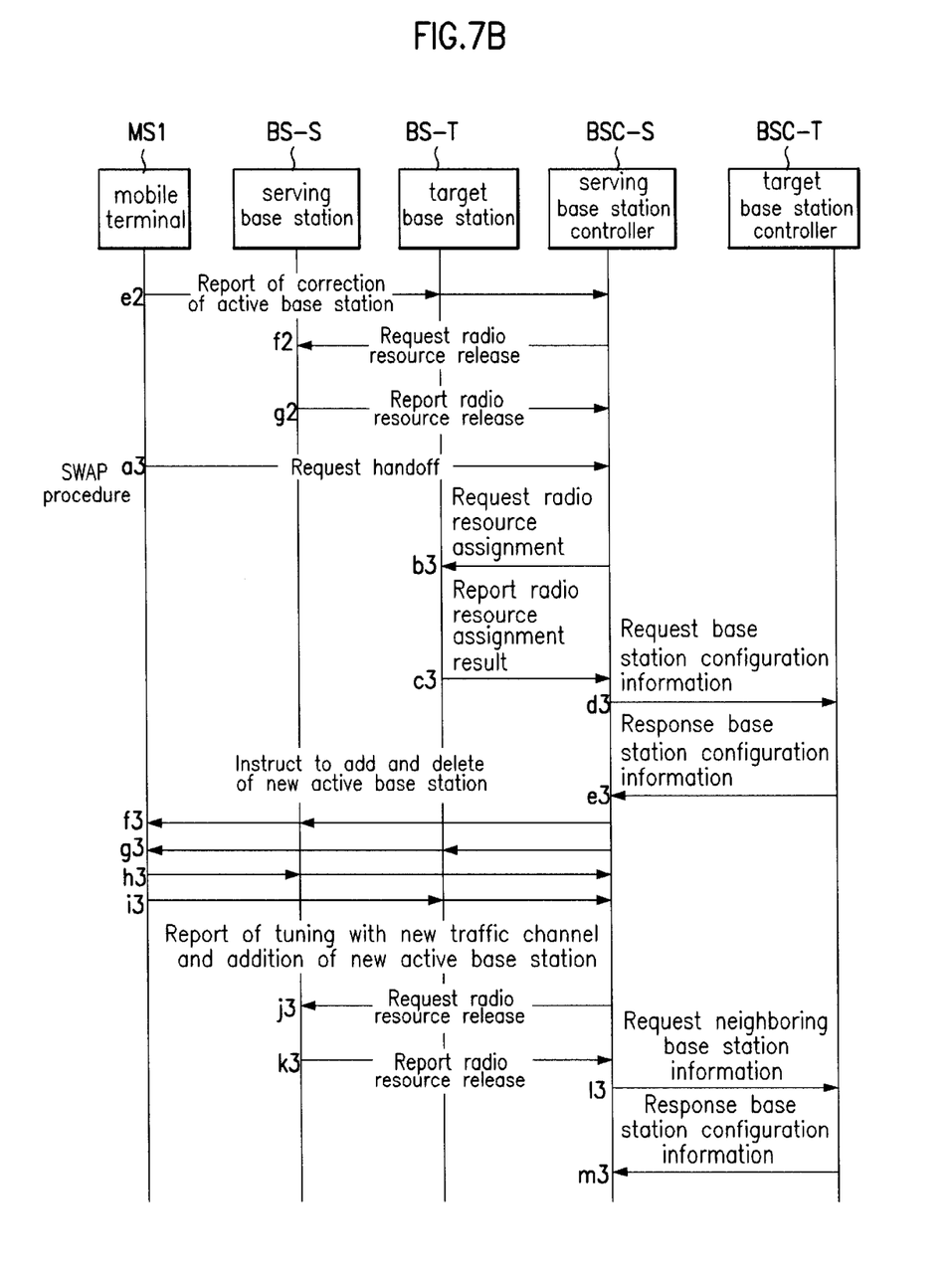

FIGS. 7A–7B are flow charts illustrating a preferred embodiment of a method for soft handoff procedures between mobile switching stations according to the present invention. The preferred embodiment of a method for soft handoff between mobile switching stations can be performed, for example, by a communication system according to the first preferred embodiment.

Soft handoff procedures between the mobile switching stations according to the second preferred embodiment of the present invention will now be described. First, a plurality of mobile switching stations are grouped and a physical communication link is set through the MCIN and the TCIN, which individually or in combination provide a communication path for implementing soft handoff between the mobile switching stations. Subsequently, the set communication link serves as a communication path for transmitting packet data for indicating handoff between the mobile switching stations. Then, network management and extension functions between the mobile switching stations are performed through the MCIN and the TCIN, disorder and alarm are detected, and packet data generated from any one of the mobile switching stations are transmitted to the other mobile switching station. Exemplary network management functions and extensions were described for the MCIN and TCIN with respect to FIG. 6.

Such a soft handoff between the mobile switching stations preferably includes adding (ADD) procedures for setting a new traffic link based on messages transmitted from the mobile station, dropping (DROP) procedures for dropping a traffic link, and swapping (SWAP) procedures. The SWAP procedures preferably simultaneously process adding and dropping procedures.

Adding procedures among soft handoff procedures between the mobile switching stations according to the second preferred embodiment will now be described with respect to FIG. 7A. A mobile station MS1 of which line is busy (e.g., traffic channel in use) by relay operation of the serving base station BS-S and control operation of the serving base station controller BSC-S continues to check the strength of a pilot signal at, for example, a neighboring or peripheral base station (e.g., target) of the serving base station BS-S. The mobile station MS1 then compares the checked strength, i.e., the strength of the pilot signal of a particular base station with a preset adding threshold value T_ADD.

If the strength of the pilot signal of the particular base station is maintained at or above the adding threshold value T-ADD for a prescribed time, the mobile station MS1 transmits a pilot strength measurement message (PSSM) including target base station information to the serving base station controller BSC-S to request handoff (a1). At this time, the PSSM, which includes the pilot strength and an original pilot pseudo-noise (PN) code of the target base station, is transmitted to the serving base station controller BSC-S in which the traffic channel is currently set. In other words, if a call is set, a radio signal from the mobile station MS1 is converted into voice signal, and signaling data through the traffic channel and the converted signal and data are transmitted to a selector vocoder control subsystem (SVCS) provided in the serving base station controller BSC-S. The SVCS transmits and receives packet having voice signal and signaling data preferably at 20 ms intervals to and from the mobile station MS1 while the traffic channel is maintained. The SVCS classifies voice signal and signaling data of the mobile station MS1 from the packet received from the traffic channel. Then, the SVCS transmits the voice signal to a digital signal processor DSP and searches for the other side base station information based on signaling data.

A call control processor CCP provided in the serving base station controller BSC-S determines handoff type using the strength of pilot signals of the peripheral base stations that are included in the signaling data, unique pilot pseudo noise PN code of the base station, and information of the target base station BS-T. At this time, assume the strength of the pilot signal is large enough, and the pilot PN code value received from the mobile station MS1 of the target base station is a different mobile switching station from a mobile switching station containing the serving base station controller BSC-S. If handoff can be implemented between the mobile switching stations, it is determined that adding soft handoff procedures can occur between the mobile switching stations. Thus, the serving base station controller BSC-S transmits handoff request message for assignment of new radio resources (traffic channel) to the target base station BS-T (b1). Upon request for assignment of traffic channel to the target base station BS-T, it is determined whether there exist respective processor addresses of the target base station BS-T and the target base station controller BSC-T. The mobile switching station address of the target base station controller BSC-T and the local switching station address preferably group the mobile switching station of the target base station controller BSC-T after analyzing the PSSM message generated from the mobile station MS1. Then, assignment for radio resources is required.

The target base station BS-T assigns new radio resources and transmits handoff assignment message to the serving base station controller BSC-S (c1). Subsequently, if new radio resources are successfully assigned, the serving base station controller BSC-S requests configuration information of the added target base station BS-T from the target base station controller BSC-T (d1). The target base station controller BSC-T provides the serving base station controller BSC-S with the target base station configuration information (e1).

The serving base station controller BSC-S that received the target base station BS-T configuration information sets the newly assigned traffic channel and link. The mobile station MS1 uses the serving traffic channel-S (TC-S) of the serving base station BS-S and the target traffic channel TC-T of the target base station BS-T at the same time. The serving base station controller BSC-S transmits an extended handoff direction message for addition of a new active base station to the mobile station MS1 using the serving traffic channel TC-S and the target traffic channel TC-T (f1, g1).

Subsequently, the mobile station MS1 transmits a handoff completion message for tuning with a new traffic channel TC-T of the target base station BS-T and addition of the active base station BS-T to the serving base station controller BSC-S through the serving traffic channel TC-S and the target traffic channel TC-T (h1, i1). The serving base station controller BSC-S deletes its active base station information and requests neighboring base station information of the added base station from the target base station controller BSC-T. Then, the target base station controller BSC-T transmits new neighboring base station information to the serving base station controller BSC-S, and the serving base station controller BSC-S updates the neighboring base station information (j1, k1).

Soft handoff dropping procedures between the mobile switching stations according to the second preferred embodiment will now be described with respect to FIGS. 7A–7B. If the pilot strength of the serving base station BS-S is maintained at a drop threshold value T_DROP or less for a certain time, the mobile station MS1 transmits pilot strength measurement message PSMM including the target base station BS-T information to the serving base station controller BSC-S through the serving traffic channel TC-S and the target traffic channel TC-T (a2, b2) to request handoff.

If it is determined to perform soft handoff between the mobile switching stations, the serving base station controller BSC-S transmits an extended handoff direction message for instructing to correct the contents of the active base station to the mobile station MS1 through the serving traffic channel TC-S and the target traffic channel TC-T (c2, d2). The mobile station MS1 transmits a handoff completion message for correction of the active base station information to the serving base station controller BSC-S (e2).

The serving base station controller BSC-S requests release the serving traffic channel TC-S assigned to the serving base station BS-S (f2). Then, the serving base station BS-S, which released the serving traffic channel TC-S, acknowledges the release result to the serving base station controller BSC-S (g2).

Soft handoff swapping procedures between the mobile switching stations according to the second preferred embodiment will be described. If the pilot strength of the target base station BS-T exceeds the adding threshold value T_ADD and concurrently the pilot strength of the serving base station BS-S is maintained at the drop threshold value T_DROP or less for a certain time, the mobile station MS1 transmits the pilot strength measurement message PSMM for handoff request to the serving base station controller BSC-S (a3).

As a result of analyzing the handoff request, if it is determined that soft handoff between the mobile switching stations should be implemented by swapping procedures, the serving base station controller transmits a handoff request message for assignment of radio resources to the target base station BS-T (b3). The target base station BS-T assigns new radio resources and then transmits a handoff assignment message to the serving base station controller BSC-S (c3).

The serving base station controller BSC-S that received the normal assignment of radio resources transmits configuration information request message of the added target base station BS-T to the target base station controller BSC-T (d3). The target base station controller BSC-T transmits the configuration information of the target base station BS-T to the serving base station controller BSC-S (e3).

The serving base station controller BSC-S transmits an extended handoff direction message for addition of a new active base station and deletion of the serving base station BS-S to the mobile station MS1 through the serving traffic channel TC-S and the target traffic channel TC-T (f3, g3). The mobile station MS1 transmits a handoff completion message for tuning with a new traffic channel and addition of a new active base station to the serving base station controller BSC-S through the serving traffic channel TC-S and the target traffic channel TC-T (h3, i3).

Subsequently, the serving base station controller BSC-S transmits a traffic channel release message for requesting release of the serving traffic channel TC-S to the serving base station BS-S (j3). The serving base station controller BSC-S receives an acknowledge message indicative of release of the serving traffic channel TC-S from the serving base station BS-S (k3).

Subsequently, the serving base station controller BSC-S requests neighboring base station configuration information from the target base station controller BSC-T and receives the neighboring base station configuration information from the target base station controller BSC-T (l3, m3). The serving base station controller BSC-S preferably updates the neighboring base station information.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. Thus, it is intended that the present invention covers the modifications and variations of the invention provided they come within the scope of the appended claims and their equivalents. In the claims, means-plus-function clauses are intended to cover the structures described herein as performing the recited function and not only structural equivalents but also equivalent structures.

What is claimed is:

1. A mobile communication system comprising:
    a plurality of base station controllers arranged in groups;
    a plurality of mobile switching centers (MSCs) each controlling a group of base station controllers;
    a telephone switch (T s/w) connecting the plurality of mobile switching centers (MSCs);
    a plurality of mobile switching stations that provide a physical link switching service between the base station controllers, wherein each of the mobile switching stations includes a first inter network that controls one or more of the base station controllers; and
    at least one local switching stations each having a second inter network that provides a communication path between the mobile switching stations, wherein a soft handoff between two base station controllers controlled by different MSCs is performed by the mobile switching stations using a first interface between the first inter network and the second inter network.

2. The mobile communication system of claim 1, wherein each of the local switching stations comprises:
    a central switching station including a third inter network, wherein the soft handoff uses a second interface between the second inter network and the third inter network, wherein the first inter network is a center CDMA Inter Network (CCIN), wherein the second inter network is a master CDMA Inter Network (MCIN), and wherein the third inter network is a Top CDMA Inter Network (TCIN).

3. The mobile communication system of claim 2, wherein the second inter network comprises:
    a routing portion that performs management and extension functions of a network, and detects and reports disorder and alarm of the network, wherein the routing portion is a master inter-working routing board assembly (MIRA);
    a first packet transmission portion that transmits packet data through the communication path, wherein the first packet transmission portion is a master inter-working gateway board assembly (MIGA); and
    a second packet transmission portion that transmits the packet data through the first interface, wherein the second packet transmission portion is a master inter-working trunk board assembly (MITA).

4. The mobile communication system of claim 2, wherein respective local switching stations further comprise at least one center switching station, wherein the center switching station includes a third inter network that provides a communication channel between the local switching stations.

5. The mobile communication system of claim 4, wherein a first local switching station of the respective local switching stations manages at least one remaining local switching stations of the respective local switching stations.

6. The mobile communication system of claim 4, wherein a second interface occurs between the second inter network and the third inter network during handoff between the local switching station and the center switching station.

7. The mobile communication system of claim 4, wherein the third inter network includes:
    a routing portion that performs management and extension functions of a network, and detects and reports disorder and alarm of the network, wherein the routing portion is a master inter-working routing board assembly (MIRA);
    a first packet transmission portion that transmits packet data through the communication path, wherein the first packet transmission portion is a master inter-working gateway board assembly (MIGA); and
    a node assembly portion that provides a third interface for linking with a cell broadcasting center for short message service, wherein the node assembly portion is a master inter-working node board assembly (MINA).

8. The mobile communication system of claim 1, wherein a data frame used for handoff between the mobile switching stations comprises:

a first field indicative of an address of each element provided in the mobile switching stations;

a second field indicative of an address of the at least one local switching station; and a third field indicative of an address of a corresponding mobile switching station.

9. The mobile communication system of claim 8, wherein the first field includes an address of a processor provided in the corresponding mobile switching station and an address of a processor provided in a corresponding base station controller.

10. The mobile communication system of claim 8, wherein the data frame further includes a fourth field indicative of an address of a center switching station.

11. A mobile communication system, comprising:

a plurality of a first group of base stations (BS);

a plurality of a second group of base stations;

a first base station controller (BSC) controlling the first group of base stations;

a second BSC controlling the second group of base stations;

a first mobile switching center (MSC) controlling the first base station controller;

a second mobile switching center controlling the second base station controller; and a switching station coupled to the first and second base station controllers, wherein when a user equipment satisfies conditions of handover between a base station of the first group and a base station of the second group, the switching station allows soft handover between the first mobile switching center and the second mobile switching center, wherein the switching station includes at least one center CDMA Inter Network (CCIN), one master CDMA Inter Network (MCIN) and one top CDMA Inter Network (TCIN) for providing an interface between first and second base station controller.

12. The mobile communication system of claim 11, further comprising:

a plurality of switching offices, wherein each of the switching offices controls at least one corresponding base station includes a corresponding mobile switching station controlling a group of base station controllers;

a plurality of additional local switching stations, wherein each of the additional local switching stations are coupled to a corresponding one of the plurality of switching offices; and a center switching station coupling the plurality of additional local switching stations and the single local switching station, wherein when the user equipment satisfies conditions of handover between base station controllers controlled using two different local switching stations, the local switching stations and the center switching stations allow soft handover between the two different local switching stations.

13. The mobile communication system of claim 11, wherein the switching station, comprises:

the first mobile switching station controlling the first base station controller;

a first local switching station connected to the first mobile switching station;

a first central switching station connected to the first local switching station;

a second central switching station connected to the first central switching station;

a second local switching station connected to the second central switching station; and the second mobile switching station controlled by the second local switching station, wherein the second mobile switching station is coupled to the second base station controller.

14. The mobile communication system of claim 11, wherein the switching station comprises:

a plurality of mobile switching stations that provide a physical link switching service between the first and second base station controllers, wherein each of the mobile switching stations includes a first inter network that controls the base station controllers; and at least one local switching stations each having a second inter network that provides a communication path between the mobile switching stations, wherein the soft handoff between the mobile switching stations is performed by a first interface between the first inter network and the second inter network.

15. The mobile communication system of claim 14, wherein the second inter network comprises:

a routing portion that performs management and extension functions of a network, and detects and reports disorder and alarm of the network, wherein the routing portion is a master inter-working routing board assembly (MIRA);

a first packet transmission portion that transmits packet data through the communication path, wherein the first packet transmission portion is a master inter-working gateway board assembly (MIGA); and a second packet transmission portion that transmits the packet data through the first interface, wherein the second packet transmission portion is a master inter-working trunk board assembly (MITA).

16. The mobile communication system of claim 14, wherein respective local switching stations further comprise at least one center switching station, wherein the center switching station includes a third inter network that provides a communication channel between the local switching stations.

17. The mobile communication system of claim 16, wherein a first local switching station of the respective local switching stations manages at least one remaining local switching stations of the respective local switching stations, wherein a second interface occurs between the second inter network and the third inter network during handoff between the local switching station and the center switching station, and wherein said each of the local switching stations are assigned to at least two mobile switching stations.

18. The mobile communication system of claim 16, wherein the third inter network includes:

a routing portion that performs management and extension functions of a network, and detects and reports disorder and alarm of the network, wherein the routing portion is a master inter-working routing board assembly (MIRA);

a first packet transmission portion that transmits packet data through the communication path, wherein the first packet transmission portion is a master inter-working gateway board assembly (MIGA); and a node assembly portion that provides a third interface for linking with a cell broadcasting center for short message service, wherein the node assembly portion is a master inter-working node board assembly (MINA).

19. The mobile communication system of claim 14, wherein a data frame used for handoff between the mobile switching stations comprises:

a first field indicative of an address of each element provided in the mobile switching stations;

a second field indicative of an address of the at least one local switching station; and a third field indicative of an address of a corresponding mobile switching station.

20. The mobile communication system of claim 19, wherein the first field includes an address of a processor provided in the corresponding mobile switching station and an address of a processor provided in a corresponding base station controller.

21. The mobile communication system of claim 19, wherein the data frame further includes a fourth field indicative of an address of a center switching station.

22. The mobile communication system of claim 11, further comprising:

a trunk switch (T s/w) connecting the first and second mobile switching centers (MSCs).

23. A method of providing mobile communications in a communication system having first and second groups of base stations that provide communications to corresponding mobile stations, comprising:

providing first and second base station controllers, wherein each of the first and second base station controllers controls the first and second groups of base stations, respectively;

providing first and second mobile switching centers that respectively control the first and second base station controllers connected to each of the first and second mobile switching centers;

providing a telephone switch (T s/w) connecting the first and second mobile switching centers (MSCs);

providing a switching station coupled to the first and second base station controllers, wherein the switching station provides an interface between the first and second base station controllers; and performing a soft handoff between the first mobile switching center and the second mobile switching center using the switching station when a user equipment satisfies conditions of handover between a base station of the first group and a base station of the second group.

24. The method of claim 23, further comprising:

establishing communications to a first mobile station from a serving base station;

determining at the first mobile station whether to perform handoff;

determining a type of handoff at a serving base station controller; and implementing the soft handoff between the first and the second mobile switching stations.

25. The method of claim 23, wherein the switching station comprises:

at least one mobile switching station (MSS) including a center CDMA Inter Network (CCIN) for providing a communication path for a first base station controller;

at least one local switching station including a master CDMA Inter Network (MCIN) for providing a communication path for an MSS; and at least one central switching station including a Top CDMA Inter Network (TCIN) for providing a communication path for a local switching station.

26. A mobile communication system comprising:

a plurality of base station controllers;

a plurality of mobile switching stations that provide a physical link switching service between the base station controllers, wherein each of the mobile switching stations includes a first inter network that controls the base station controllers; and at least one local switching stations each having a second inter network that provides a communication path between the mobile switching stations, wherein a handoff between the mobile switching stations is performed by a first interface between the first inter network and the second inter network, wherein the second inter network comprises, a routing portion that performs management and extension functions of a network, and detects and reports disorder and alarm of the network, wherein the routing portion is a master inter-working routing board assembly (MIRA), a first packet transmission portion that transmits packet data through the communication path, wherein the first packet transmission portion is a master inter-working gateway board assembly (MIGA), and a second packet transmission portion that transmits the packet data through the first interface, wherein the second packet transmission portion is a master inter-working trunk board assembly (MITA).

27. A mobile communication system comprising:

a plurality of base station controllers;

a plurality of mobile switching stations that provide a physical link switching service between the base station controllers, wherein each of the mobile switching stations includes a first inter network that controls the base station controllers; and at least one local switching stations each having a second inter network that provides a communication path between the mobile switching stations, wherein a handoff between the mobile switching stations is performed by a first interface between the first inter network and the second inter network, wherein a data frame used for handoff between the mobile switching stations comprises, a first field indicative of an address of each element provided in the mobile switching stations, a second field indicative of an address of the at least one local switching station, and a third field indicative of an address of a corresponding mobile switching station, wherein the first field includes an address of a processor provided in the corresponding mobile switching station and an address of a processor provided in a corresponding base station controller.

* * * * *